US011039716B2

(12) United States Patent
Faria Rocha et al.

(10) Patent No.: US 11,039,716 B2
(45) Date of Patent: Jun. 22, 2021

(54) KITCHEN MACHINE

(71) Applicant: MODELO CONTINENTE HIPERMERCADOS, S.A., Senhora da Hora (PT)

(72) Inventors: Duarte Nuno Faria Rocha, Aveiro (PT); Rui Antonio Pinho, Maia (PT)

(73) Assignee: MODELO CONTINENTE HIPERMERCADOS, S.A., Senhora da Hora (PT)

( * ) Notice: Subject to any disclaimer, the term of this patent is extended or adjusted under 35 U.S.C. 154(b) by 824 days.

(21) Appl. No.: 15/201,636

(22) Filed: Jul. 5, 2016

(65) Prior Publication Data

US 2017/0000294 A1 Jan. 5, 2017

(30) Foreign Application Priority Data

Jul. 2, 2015 (PT) .................................. 108651

(51) Int. Cl.
*A47J 43/07* (2006.01)
*A47J 43/06* (2006.01)
*A47J 43/046* (2006.01)

(52) U.S. Cl.
CPC ......... *A47J 43/0722* (2013.01); *A47J 43/046* (2013.01); *A47J 43/06* (2013.01); *A47J 43/075* (2013.01); *A47J 43/0727* (2013.01)

(58) Field of Classification Search
CPC ........ A61J 7/0007; A61J 3/02; A47J 43/0722; A47J 43/046; A47J 43/06; A47J 43/0727; A47J 43/075; A47J 42/04; A47J 42/46; A47J 42/14; A47J 42/40; A47J 42/00; A47J 42/50

USPC ......... 241/60, 169.1; 99/275, 326, 327, 328, 99/329, 330, 331, 332, 333, 334, 335, 99/348, 468, 492, 509, 510, 511
See application file for complete search history.

(56) References Cited

U.S. PATENT DOCUMENTS

| 3,493,215 | A | | 2/1970 | Edwards et al. | |
|---|---|---|---|---|---|
| 4,763,567 | A | * | 8/1988 | Dalquist, III | A47J 36/165 366/247 |
| 5,567,049 | A | * | 10/1996 | Beaudet | A47J 43/0777 241/36 |
| 7,364,348 | B1 | * | 4/2008 | Jones | A47J 43/042 366/130 |
| 2004/0042337 | A1 | * | 3/2004 | Yiu | A47J 43/046 366/199 |
| 2004/0042338 | A1 | * | 3/2004 | Wu | A47J 43/0727 366/205 |

(Continued)

FOREIGN PATENT DOCUMENTS

| EP | 0549818 A1 | 7/1993 |
|---|---|---|
| EP | 1981383 B1 | 10/2008 |
| GB | 2457909 A | 2/2009 |

*Primary Examiner* — Tu B Hoang
*Assistant Examiner* — Masahiko Muranami
(74) *Attorney, Agent, or Firm* — Mark M. Friedman

(57) ABSTRACT

A kitchen machine to improve the operation, safety, ergonomics, and versatility. The kitchen machine consists essentially of: a machine body (1) inside which there is a main engine (3) with adjustable operation in both directions, and a control panel (2) through which the user interacts with the kitchen machine and is directly connected to the entire set of electronic components (4) intended to control and manage the machine operation.

3 Claims, 9 Drawing Sheets

(56) References Cited

U.S. PATENT DOCUMENTS

| | | | |
|---|---|---|---|
| 2005/0263637 A1* | 12/2005 | Oliver | A47J 42/40 241/282 |
| 2007/0296224 A1* | 12/2007 | Courier | E05B 17/0029 292/109 |
| 2008/0135654 A1* | 6/2008 | Pryor | A47J 43/0716 241/37.5 |
| 2010/0206701 A1* | 8/2010 | Ferraby | A47J 43/0794 200/50.1 |
| 2011/0013478 A1* | 1/2011 | Athey | A47J 43/0766 366/205 |
| 2012/0206995 A1* | 8/2012 | Wu | F16P 3/08 366/205 |
| 2013/0048770 A1* | 2/2013 | Wong | A47J 43/0705 241/100 |
| 2013/0264403 A1* | 10/2013 | Thai | A47J 43/046 241/191 |
| 2014/0318874 A1* | 10/2014 | Moses | G01G 19/414 177/1 |
| 2015/0069765 A1* | 3/2015 | Denison | E05B 47/0012 292/144 |
| 2015/0098298 A1* | 4/2015 | Sapire | A47J 43/046 366/144 |

\* cited by examiner

KITCHEN MACHINE

TECHNICAL FIELD OF THE INVENTION

The present invention applies to kitchen machines and aims to improve the operation, safety, ergonomics and versatility in using this home appliance. This kitchen machine is intended for preparing and cooking a large variety of meals in an easier and more efficient way with the possibility of using two containers of substantially different volumes in an alternate or complementary way.

BACKGROUND OF THE INVENTION

There are several known kitchen machines. Among them, one can do reference to WO95/29615 which shows a concept of kitchen machine able to process food with a mechanically driven mixing container.

DESCRIPTION OF THE FIGURES

For an easier understanding of the invention there are attached figures that represent preferred embodiments and are not intended to limit the object of the present invention.

GENERAL DESCRIPTION OF THE INVENTION

Figure 1:
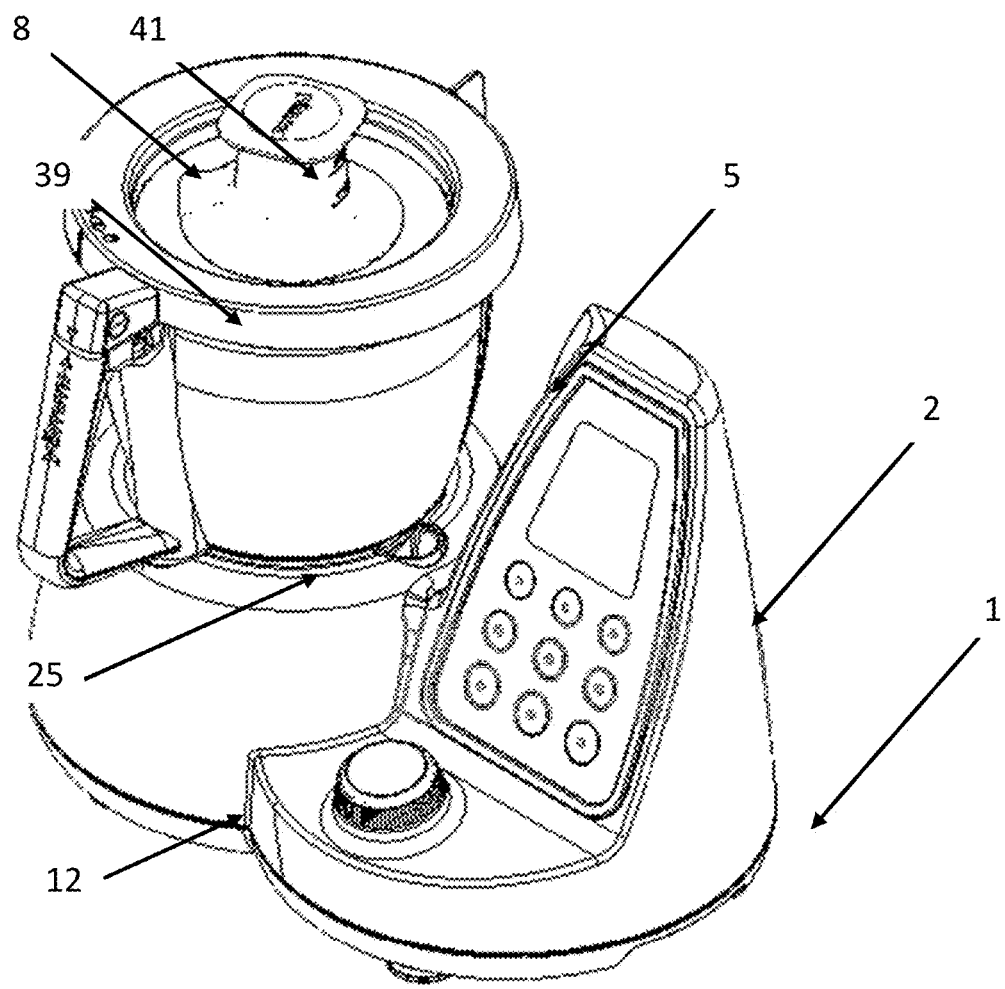
FIG. 1: In this figure one can observe a three-dimensional view of the kitchen machine.
Figure 2:
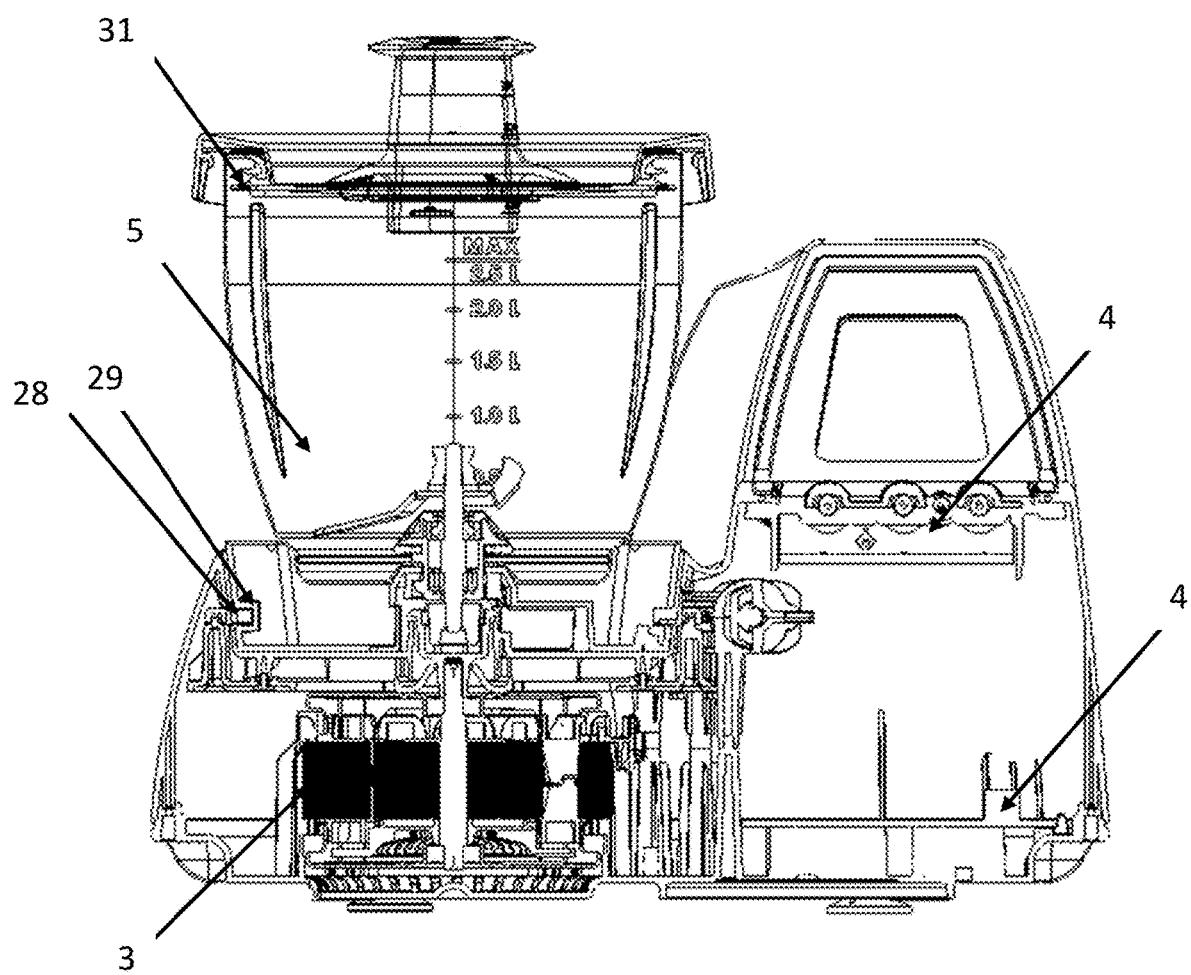
FIG. 2: In this figure one can observe a three-dimensional view of the interior of the kitchen machine where the main components such as the machine body (1), control panel (2), main engine (3) are shown.
Figure 3:
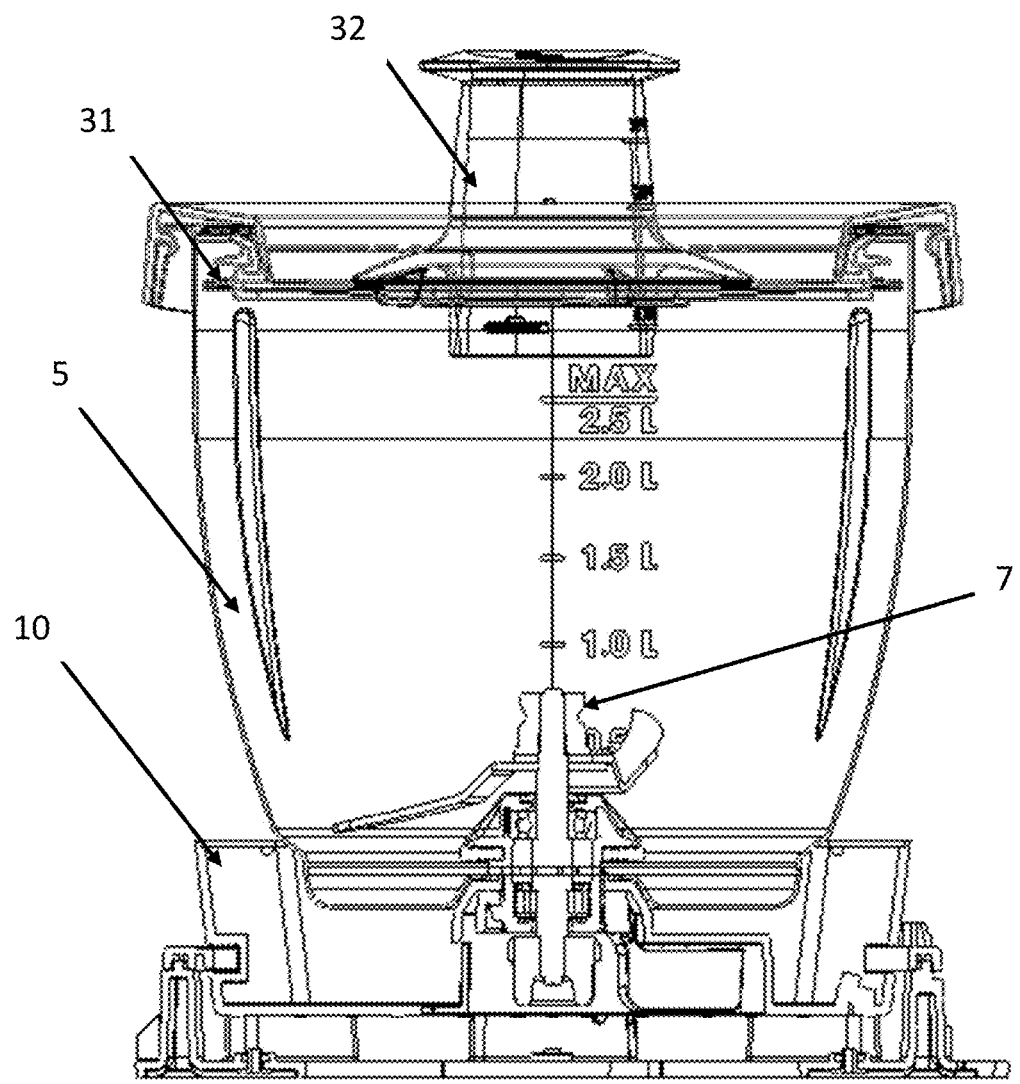
FIG. 3: In this figure one can observe the overall cross-sectional view of the blade block (7) inside the container (5, 6) and the coupling zone between the blade block (24) and the main engine (3).
Figure 4:
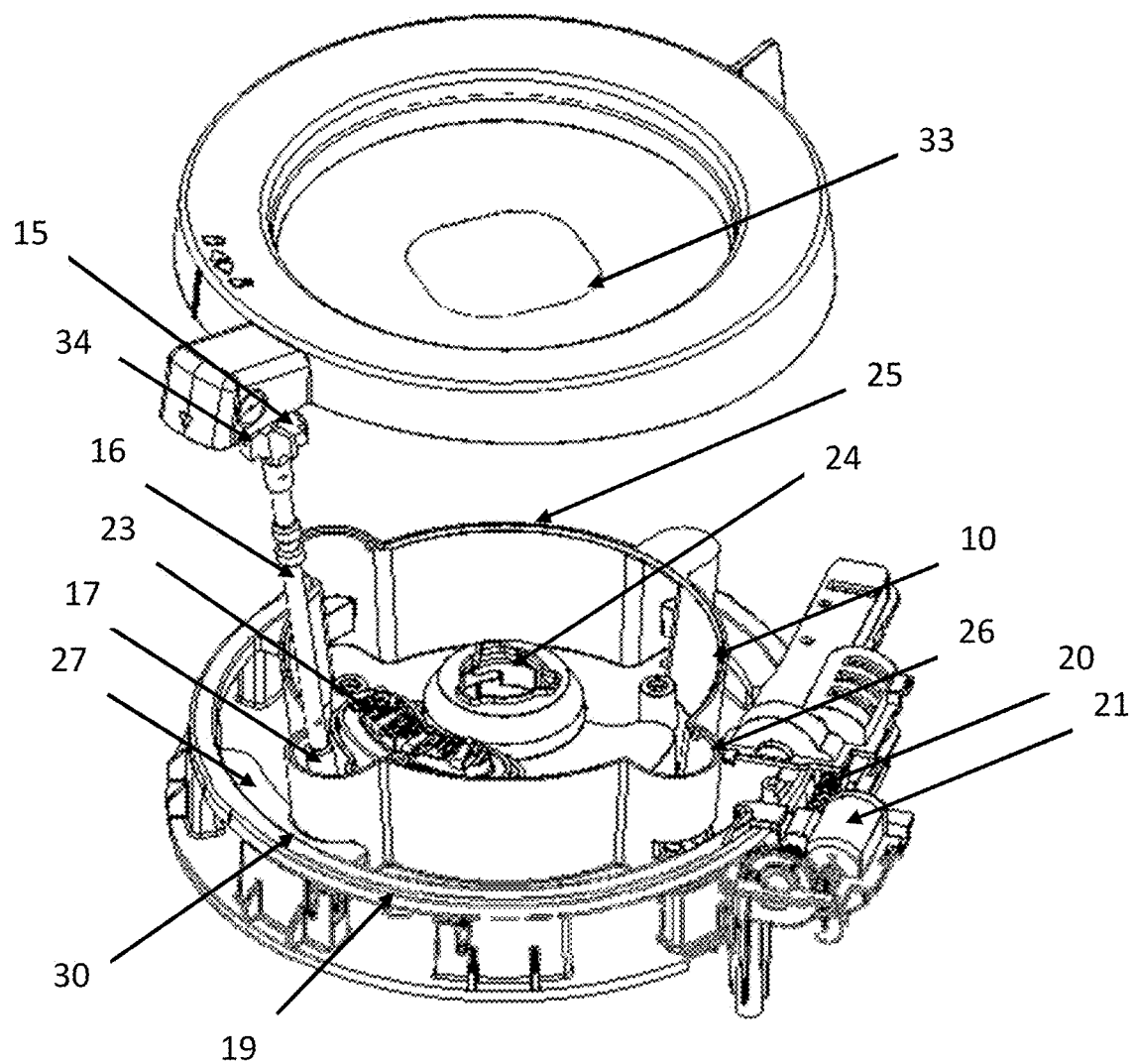
FIG. 4: In this figure one can observe all the locking mechanism (14) in an forward position ensuring the lock. The main components of this mechanism are shown, namely: gear wheel (15), shaft (16) for motion transmission to the locking cylinder (17), rotating locking ring (19) driven by direct contact of the worm screw (20).
Figure 5:
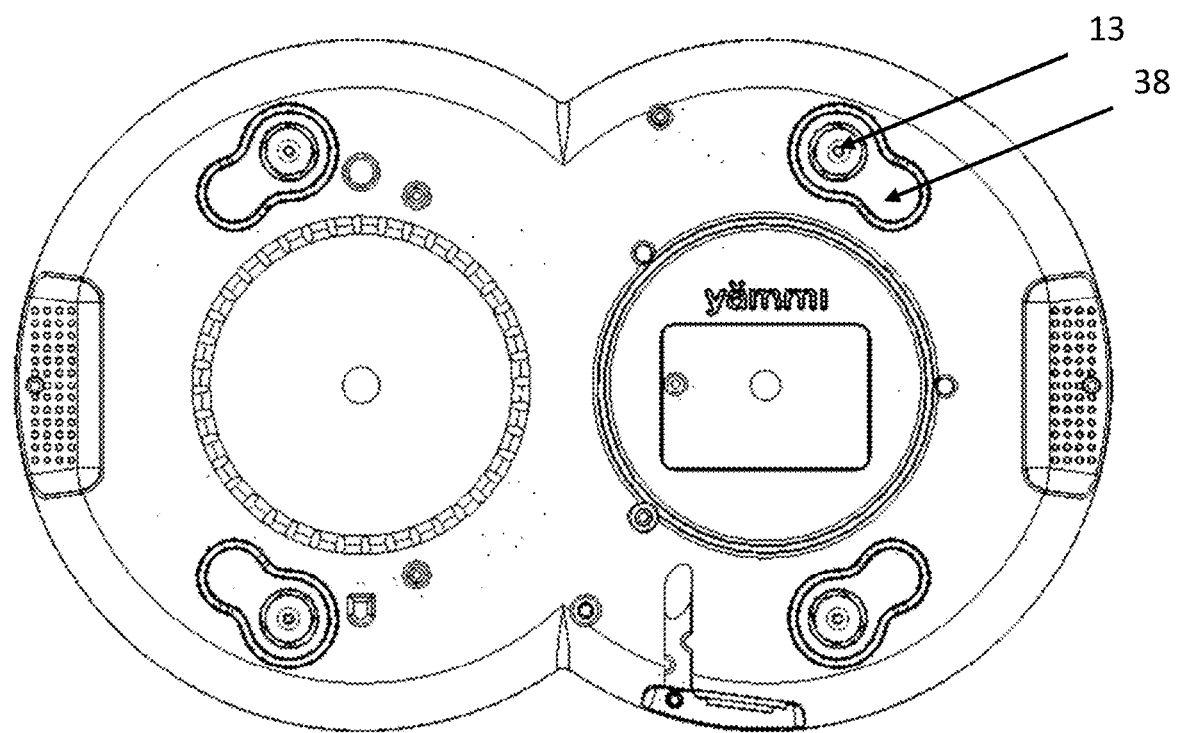
FIG. 5: In this figure one can observe a bottom view of the machine base (12) showing the outer location of the supports (38) of the machine which accommodate the load cells (13).
Figure 6:
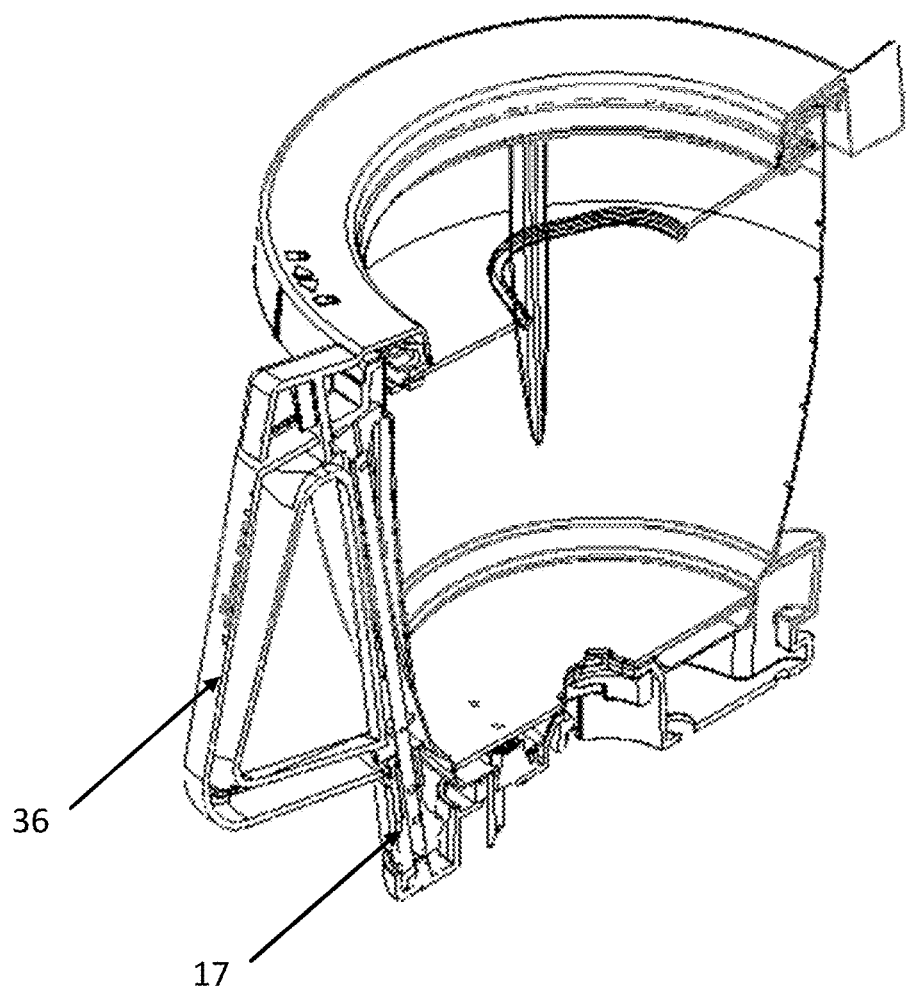
FIG. 6: In this figure one can observe a cross-sectional view of the cup (5) with its respective lid (8), cup base (10) and handle (36).
Figure 7:
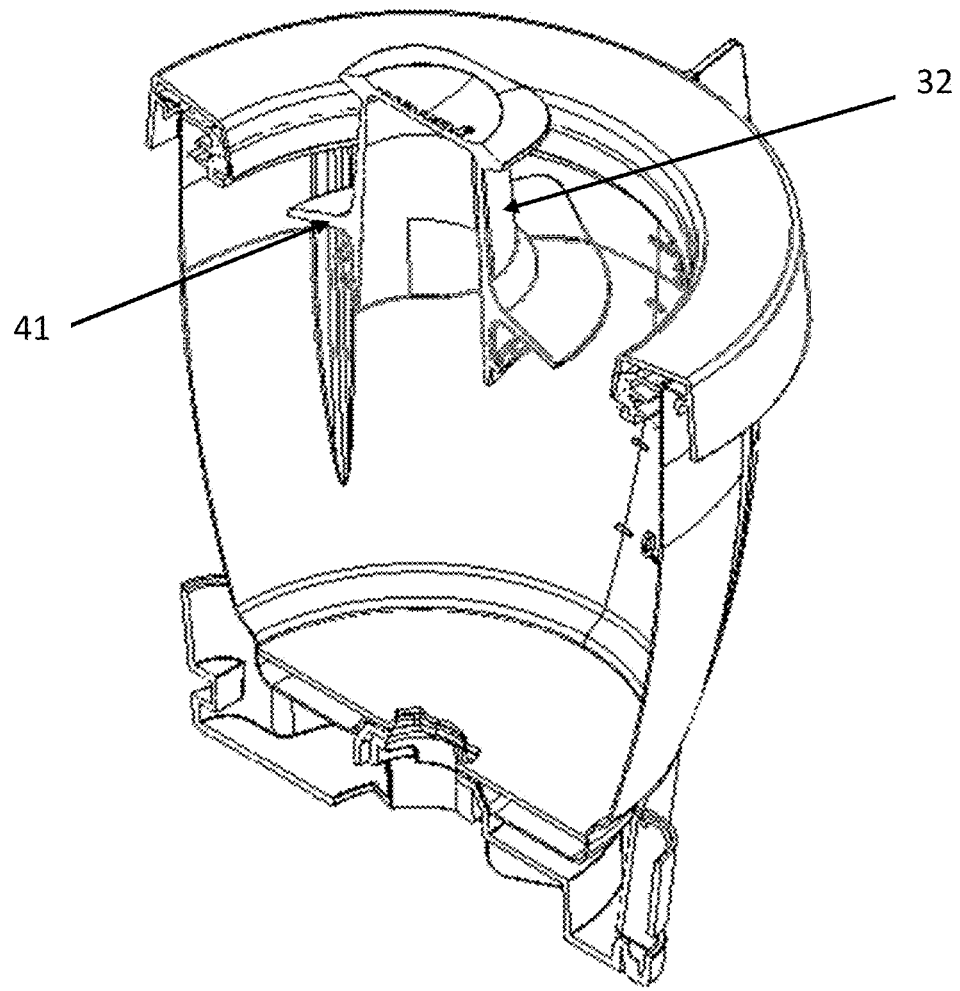
FIG. 7: In this figure one can observe a cross-sectional view of the pan (6) with its respective lid (9), pan base (11) and wings (37).
Figure 8:
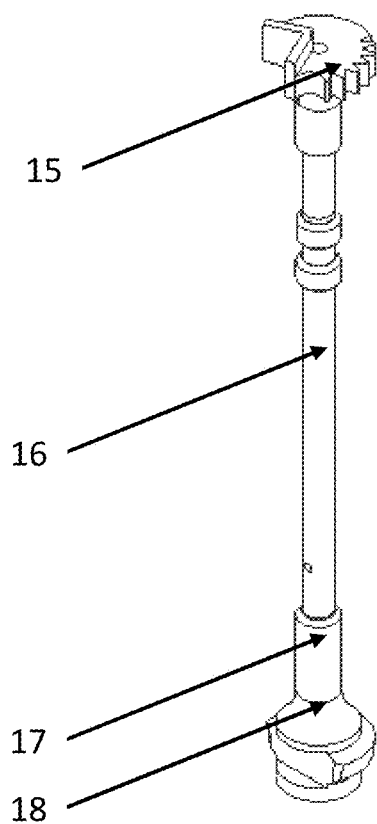
Figure 9:
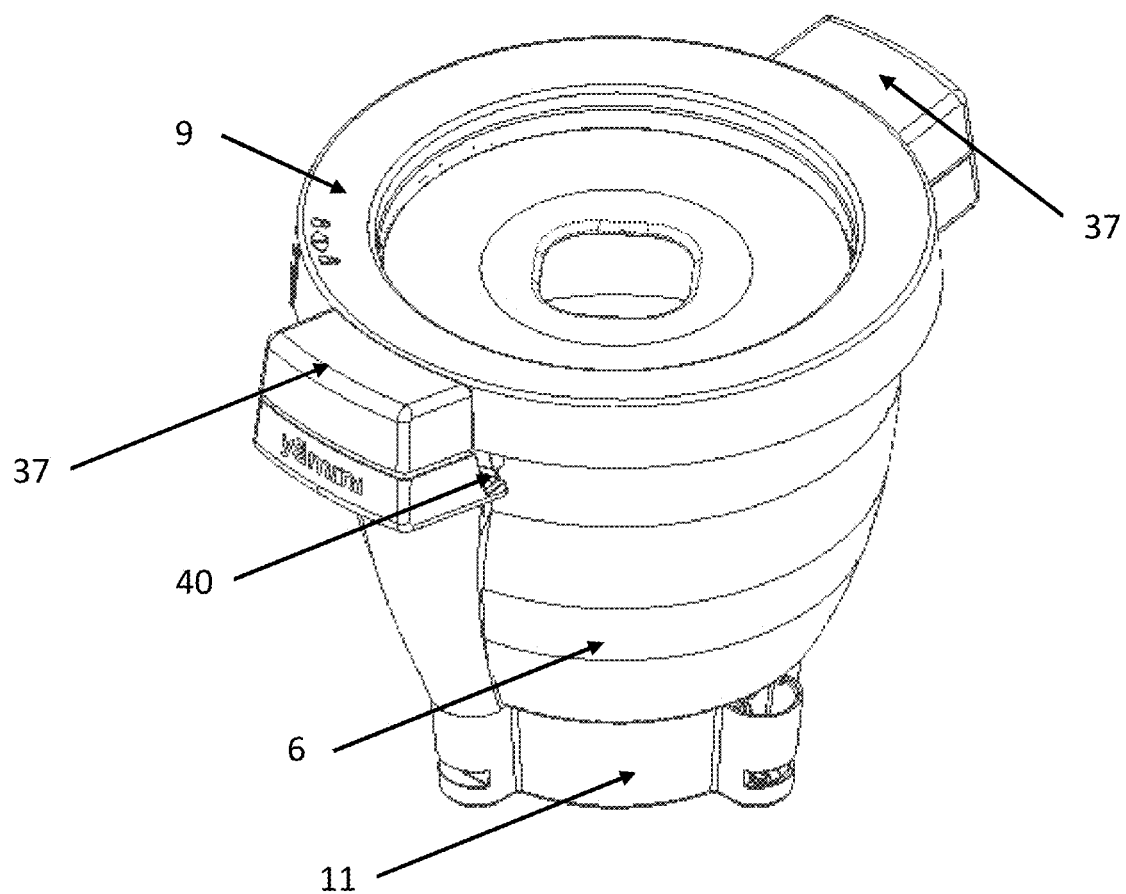

The invention relates to a kitchen machine for preparing and cooking a large variety of meals in an easier and more efficient way. The present invention aims to improve the operation, safety, ergonomics and versatility in using kitchen machines.

The kitchen machine is characterized by the interchangeability between the cup (5) and pan (6) thus ensuring an alternate or complementary use of both containers that clearly have different volumes—the cup (5) which allows cooking meals for two to four persons while the pan (6) allows cooking a larger number of meals for more than four persons due to its considerably higher capacity compared to the cup (5)—wherein all the coupling system of the base (10) of the cup (5) is equivalent and transposable to the coupling system of the base (11) of the pan (6) to the machine body, and thus its alternate use is totally feasible and interchangeable in the same machine, and wherein the locking system is formed in the zone of the machine vat (25) by four cavities (26) distributed at 90° from each other which are recessed and where the couplings (27) of the base of the cup (5) and/or pan (6) are inlaid when placed in the kitchen machine, each cavity (26) having a window (28) which is coincident with the window (29) of the cup base (10) and/or pan base (11) and through which passes the jointly coupling (30) of the rotating locking ring (19), wherein each one and every component in the outer zone of the machine vat (25) is harmonized to both the bases (10, 11) of the containers, namely: a block consisting of five pins (23), a hexagonal socket of the engine coupling (24), a block (7) of rotating blades which are movable and applicable inside the containers (5, 6); wherein the entire locking mechanism (14) of the containers (5, 6) to the machine body (1) is also compatible to both containers.

Below the preferred embodiment of the invention is described with reference to the attached figures (A2).

The user interacts with the kitchen machine through the control panel (2), which is included in the machine body (1) and is directly connected to the entire set of electronic components (4). This control panel (2) is intended to manage the entire operation of the machine, including: the operation speed of the main engine (3) and its direction of rotation, the heating temperature of the base of the container (5, 6) where food is cooked, the operation timing of the rotor that drives the blade block (7), and also to manage the safety conditions of operation of the entire machine.

The user inserts the blade block (7) inside the containers (5, 6), which can be removed for cleaning and hygienisation. This blade block (7) consists of four rotating blades fixed at 90° from each other and whose rotation speed is imposed through the coupling with the engine block (24) which completely transmits the rotation of the main engine (3) located directly below this set. Since the main engine (3) is capable of rotating in both directions, also the blade block (7) is capable of rotating in both the clockwise and counterclockwise directions.

The cup (5) and the pan (6) are containers having different cooking volumes, allowing the user to choose one or the other depending on the number of persons for whom the meals to be cooked are intended for. While the cup (5) allows cooking meals for two to four persons, the pan (6) allows cooking a larger number of meals for more than four persons due to its considerably higher capacity compared to the cup (5) The fact that the containers (5, 6) have quite different capacities does not prevent its applicability in the same machine body (1), since the entire locking system of the base (10, 11) of each container (5, 6) to the machine body (1) is exactly the same. Also the elements of the pin block (23), the engine coupling socket (24) and the rotating blade block (7) of these containers (5, 6) are equal and of feasible interchangeability, including the locking mechanism (14) of the containers to the machine body (1).

Each one of the containers (5, has its own separate lid (8, 9) whose function is to prevent unintentional access to the interior of the container while the blade block is working (7) and prevent the projection of liquid and particles to the outside.

In the center of the lid (8, 9) of each container (5, 6) there is a quadrangular hole with round corners (33) which can be covered using the measuring cup (32). This measuring cup (32), which is the same for both lids (8, 9), has a graduation scale printed on it thus allowing a quick and easy measurement of small volumes of liquid or solids while using the kitchen machine, without needing to use extra tools.

The measuring cup (32) when placed in the hole (33) does not allow the vapor overpressure inside the container (5, 6), which could induce the projection of liquid or particles, due to its clover leaf shape thus allowing the existence of preferred exhaust paths to the umbrella-type shoulder zone (41) around the entire measuring cup (32). This shoulder zone ensures that any projection is directed downwards towards the lid and not upwards with the risk of reaching the user, thus ensuring maximum safety during operation of the kitchen machine. Notwithstanding the fact that the measuring cup (32) is applicable to the lid (8, 9) of each container (5, 6) in order to prevent the projection of liquid or particles in the direction of the kitchen machine user, it can be fixed to the lid (8, 9) thus allowing its free handling without the occurrence of unintentional detachment. The measuring cup (32) when placed in the hole (33) can be fixed by the user with a small rotating motion.

As the user safety was one of the major issues along the development of this kitchen machine, there is a locking and blocking mechanism (14) acting jointly between the lid (8, 9) and the container (5, 6), and between the container (5, 6) and the machine body (1), which prevents that the main engine (3) is switched-on without these elements being properly placed in the kitchen machine. This locking system of the container (5, 6) is housed in the machine base (12) and is driven by a locking engine (21) with a worm screw (20) coupled to its shaft, which in turn drives the locking ring (19) by direct contact in order it can do a rotating movement around the vat (25) through the interior of the machine body (1). In the zone of the machine vat (25) there are four cavities (26) distributed at 90° from each other which are recessed and where the couplings (27) of the base of the cup (5) and/or pan (6) are inlaid when those are placed in the kitchen machine, each cavity (26) having a window (28) which is coincident with the window (29) in the cup base (10) and/or pan base (11) and through which passes the jointly coupling (30) of the rotating locking ring (19). The rotating locking ring (19) in the forward position causes the locking of the cup base (10) or pan base (11), since this coupling (27) is located between the zone of the cup base (10) or pan base (11) and the zone of the machine vat (25), which prevents the cup (5) or the pan (6) of being removed. The locking ring in the fully forward position allows a full coupling of the container (5, 6) assembly in the machine body (1) and thereby guarantees total safety of use of the kitchen machine even if it is running at high rotating speed.

The locking between the container (5, 6) and machine body (1) of this kitchen machine is always ensured when the main engine (3) driving the rotating blade block (7) is switched-on; when the main engine (3) is switched-off the locking ring (19) automatically recedes and thus the locking system is located only inside of the machine vat (25), thus enabling the container (5, 6) to be removed from kitchen machine without the need of any further operation.

To ensure that there are no accidents due to the possible projection of liquids or particles while the blade block is working (7) (in particular when blades are hot and running at high speed), it is indispensable the existence of a control and blocking system of the lid (8, 9), in the container (5, 6) and simultaneously in the machine body (1), in order to ensure that the kitchen machine is never powered on if the lid is not properly placed, and to prevent its opening during operation.

When the lid (8, 9) is placed on the container it remains slightly recessed in the cup (5) or pan (6) in order to achieve the full sealing ring (31) action therein, thus ensuring the complete tightness in this perimeter.

The lid (8, 9) completely inserted into the container and, when rotated thereon, allows the rack portion (34, 35) being inserted through the window (39, 40) on the upper part of the handle (36) of the cup (5) or the wing (37) of the pan (6). Inside this window (39, 40) there is a gear wheel (15) which is engaged by direct contact of the rack (34, 35) as a result of the rotating movement of the lid. This gear wheel (15) is located in the upper end of the shaft (16) and communicates all the induced rotation movements to the locking cylinder (17) on the lower end, wherein this locking cylinder (17) has a facet (18) and is fixed to the cup base (10) or pan base (11). Depending on the position of the facet (18) of the locking cylinder (17), it allows or prevents the rotation movement of the locking ring (19).

When the lid (8, 9) is locked, the facet (18) remains in position to receive the locking ring (19), and the latter, by moving forward, remains jointly solidary to the entire locking system (14) thus not allowing the lid (8, 9) nor the container (5, 6) of being removed from the kitchen machine in operation, thereby ensuring the user safety since he cannot access the moving blade block (7), and as the container (5, 6) is closed the projection of liquid or particles is eliminated. Otherwise, if the lid (8, 9) is not correctly placed, the facet (18) will never remain in position to receive the locking ring (19) and thus the locking operation of the container (5, 6) is not completed, resulting in an inoperative kitchen machine.

This kitchen machine is complemented by a weighing system having four load cells (13) arranged inside the machine body base (12), strategically distributed in opposite zones and housed in machine, supports (38). Using load cells (13) in a number equal to four, the physical stability of the kitchen machine is maximized during the operation by having a larger support base of the machine body (1) and the efficiency of the weighing process is optimized.

LEGEND OF THE FIGURES machine body (1)
control panel (2)
main engine (3)
electronic components (4)
cup (5)
pan (6)
base of the container (5, 6)
blade block (7)
lids (8, 9)
lid (8) of the cup
lid (9) of the pan
cup base (10)
coupling system of the bases (10, 11)
machine body base (12)
load cells (13)
locking mechanism (14)
gear wheel (15)
shaft for motion transmission (16)
locking cylinder (17)
facet zone (18)
rotating locking ring (19)
worm screw (20)
locking engine (21)
unassigned component (22)
pin block (23)
blade block coupling (24)
zone of the machine vat (25)
cavity (26)

coupling (27)
window (28) in the vat of the machine
window (29) in the cup base
jointly coupling (30)
sealing ring (31)
measuring cup (32)
hole (33)
rack portion (34, 35)
handle (36)
wings (37)
machine supports (38)
window of the handle locking mechanism (39)
window of the wing locking mechanism (40)
window (39, 40)
shoulder zone (41)

The invention claimed is:

1. A kitchen machine comprising:
a machine body comprising a locking system comprising a locking engine that drives a locking ring; and
at least one of a cup and a pan, each of the at least one of a cup and pan comprising a base that fits into the machine body and is locked therein during operation of the kitchen machine, each of the at least one of a cup and a pan comprising a lid and a handle;
wherein the base of the at least one of a cup and a pan includes four couplings, each having a window;
wherein the machine body includes four cavities that receive the four couplings, each cavity having a window that, upon engagement with a coupling, is coincident with the window of the coupling to which it is engaged;
wherein when the machine is switched on, the locking engine rotates the locking ring from a retracted position to a forward position where the locking ring engages the coincident windows thereby preventing the at least one of a cup and a pan from being removed from the machine body;
wherein when the machine is switched off, the locking ring automatically recedes from the forward position to the retracted position thereby disengaging from the coincident windows and allowing removal of the at least one of a cup and a pan from the machine body;
wherein the locking system comprises a rack portion, a shaft, a gear wheel located at an upper end of the shaft, and a locking cylinder fixed to the base of the cup or to the base of the pan;
wherein the rack portion is passed through the handle and engaging with the gear wheel and transmitting the rotational motion of the gear wheel to the locking cylinder through the shaft;
wherein the gear wheel is engaged by the rack portion when the rack portion is inserted through a window of the handle;
wherein a rotation of the lid causes a rotation of the gear wheel which is transmitted to the locking cylinder via the shaft and prevents rotation of the locking ring;
wherein the locking system prevents a main engine from rotating a blade block if the lid is not placed properly on the at least one of the cup and the pan, and further prevents the lid from being opened during machine operation when the lid is placed properly on the at least one of the cup and the pan;
wherein the locking cylinder comprises a facet zone that receives the locking ring, the locking cylinder capable of assuming a position that either allows or prevents the facet zone from receiving the locking ring depending on the movement transmitted by the gear wheel;
wherein the locking cylinder, when moved in a locking direction, is in a position where the facet zone is receiving the locking ring thereby locking the lid in place;
wherein if the lid is not placed properly on the at least one of the cup and the pan, the rack portion is prevented from engaging with the gear wheel, thereby preventing the locking cylinder from being in a position to receive the locking ring in the facet zone; and
wherein if the locking ring is not received by the locking cylinder, the main engine is incapable of being switched on.

2. The kitchen machine according to claim 1, wherein the machine is equipped with an integrated weighing system comprising of at least four load cells arranged inside a base of the machine body, and distributed in opposite zones and housed in supports of the base, wherein using load cells in a number equal to four, the physical stability and balance of the kitchen machine is maximized during the operation, allowing a larger support base of the entire machine body and optimizing the efficiency of the weighing process.

3. The kitchen machine according to claim 1, wherein the lid comprises a quadrangular hole with round corners in the center thereof, and wherein the kitchen machine further comprises a measuring cup that can be placed within the hole to prevent access to an interior of the at least one of a cup and a pan, and to prevent projection of particles from within the interior of the at least one a cup and a pan through the hole.

* * * * *